(12) United States Patent
Horton

(10) Patent No.: US 8,450,248 B2
(45) Date of Patent: May 28, 2013

(54) OIL WELL FRACTURING FLUIDS

(75) Inventor: David P. Horton, Calgary (CA)

(73) Assignee: Engenium Chemicals Corp., Calgary (CA)

(*) Notice: Subject to any disclaimer, the term of this patent is extended or adjusted under 35 U.S.C. 154(b) by 450 days.

(21) Appl. No.: 11/936,739

(22) Filed: Nov. 7, 2007

(65) Prior Publication Data
US 2008/0108521 A1 May 8, 2008

Related U.S. Application Data

(60) Provisional application No. 60/864,829, filed on Nov. 8, 2006.

(51) Int. Cl.
*C09K 8/68* (2006.01)

(52) U.S. Cl.
CPC .................................... *C09K 8/68* (2013.01)
USPC .................................. 507/211; 166/305.1

(58) Field of Classification Search
CPC ........................................................ C09K 8/68
USPC ...................................... 507/211; 166/305.1
See application file for complete search history.

(56) References Cited

U.S. PATENT DOCUMENTS

| | | | |
|---|---|---|---|
| 4,619,776 A * | 10/1986 | Mondshine | 507/211 |
| 4,620,596 A | 11/1986 | Mondshine | |
| 4,813,482 A * | 3/1989 | Walton | 166/267 |
| 4,822,500 A | 4/1989 | Dobson, Jr. et al. | |
| 5,266,224 A * | 11/1993 | Sharif | 507/241 |
| 5,565,513 A | 10/1996 | Kinsey, III et al. | |
| 5,877,127 A * | 3/1999 | Card et al. | 507/273 |
| 6,743,756 B2 | 6/2004 | Harris, Jr. | |
| 6,887,597 B1 * | 5/2005 | Yang et al. | 429/437 |
| 6,936,575 B2 | 8/2005 | Dobson, Jr. et al. | |
| 7,013,974 B2 | 3/2006 | Hanes, Jr. | |
| 2002/0125012 A1 | 9/2002 | Dawson et al. | |
| 2002/0193256 A1 * | 12/2002 | Harris, Jr. | 507/200 |
| 2003/0144154 A1 | 7/2003 | Dobson, Jr. et al. | |
| 2005/0061507 A1 * | 3/2005 | Hanes, Jr. | 166/300 |
| 2005/0065040 A1 * | 3/2005 | Weaver et al. | 507/227 |
| 2005/0178553 A1 * | 8/2005 | Harris | 166/308.5 |
| 2006/0009363 A1 | 1/2006 | Crews | |
| 2006/0041028 A1 * | 2/2006 | Crews | 516/135 |
| 2006/0058198 A1 | 3/2006 | Dessinges et al. | |
| 2006/0116296 A1 * | 6/2006 | Kippie et al. | 507/244 |
| 2006/0205605 A1 | 9/2006 | Dessinges et al. | |

* cited by examiner

*Primary Examiner* — Alicia Toscano
(74) *Attorney, Agent, or Firm* — Bennett Jones LLP

(57) ABSTRACT

Additives useful in attenuating the crosslinking time of sparingly soluble borate minerals and the use of those additives in oil well fracturing fluids and methods are described.

17 Claims, 5 Drawing Sheets

Rheological Profile for Delayed Borate

OIL WELL FRACTURING FLUIDS

FIELD

The present invention relates to oil well fracturing fluids and in particular delayed crosslinking fluids.

BACKGROUND

Polysaccharide based aqueous oil well fracturing fluids are typically comprised of two principle components and various ancillary additives. The two principle components are the viscosifying polysaccharide, typically a hydrating gum such as guar gum, hydroxypropylguar or carboxymethylhydroxypropylguar (hereafter collectively referred to as "a guar or derivatized guar" compound) and a crosslinking agent that imparts visco-elastic properties to the viscous fluid. Typically the crosslinking agent will be one of a zirconium, a titanium or a borate compound.

Addition of water soluble borates at a suitable pH to a guar or derivatized guar based fluid usually results in rapid (<20 seconds) crosslinking of the fluid. At times it is desirable to delay the crosslinking of the fluid for a period of time greater than 20 seconds to allow, for example, the fluid to enter an oil and/or gas bearing formation as a viscous fluid and then have the crosslinking occur whilst in the formation.

To that end, in U.S. Pat. No. 4,619,776 of Mondshine describe delayed borate crosslinking agents using calcium and borate containing minerals such as colemanite, ulexite and probertite. These fluids are also advantageous for stability. As the temperature of the fracturing fluid increases, the solubility of these borate minerals increases releasing further borate ions which stabilize the system. The ability to regulate, to some degree, the rate at which products crosslink by varying the ratios of colemanite, calcined colemanite and ulexite has been disclosed. Colemanite by itself is not useful since the delay times are frequently too great.

Harris, Jr. in U.S. Pat. No. 6,743,756 has described the use of dehydrated boric acid and boric acid salts for use as delayed crosslinkers. High temperature stability may be problematic in these systems. While the materials disclosed in this reference can be added at concentrations that are sufficient to impart higher temperature stability, at these higher concentrations the desired delay in crosslinking no longer occurs. In particular, the crosslink is substantially instantaneous.

SUMMARY

Agents to delay crosslinking in fluids crosslinked by borate compounds, fracturing fluids and methods have been invented. In particular, hereinafter additives useful in attenuating the cross link time of sparingly soluble borate minerals and the use of those additives in oil well fracturing fluids and methods are described.

In accordance with a broad aspect of the present invention, there is provided a method for fracturing a formation accessible through a wellbore, the method comprising: providing a fracturing fluid including a viscosifying polysaccharide, a sparingly soluble borate-based mineral and a metal sequestering agent; introducing the fracturing fluid to the wellbore to contact the formation; and pumping the fracturing fluid to induce and propagate a fracture in the formation.

In accordance with another broad aspect of the present invention, there is provided a wellbore fracturing fluid comprising: a guar or derivatized guar based fluid, a sparingly soluble borate-based mineral and a metal sequestering agent.

In accordance with another broad aspect of the present invention, there is provided a method for delaying the cross linking of a fracturing fluid, comprising: providing a guar or derivatized guar based fluid and adding to the fluid a metal sequestering agent and a sparingly soluble borate-based mineral, wherein the metal sequestering agent sequesters a metal solubilised from the sparingly soluble borate-based mineral to drive the solubilisation of additional sparingly soluble borate-based mineral such that at least 30 seconds after adding the a metal sequestering agent and a sparingly soluble borate-based mineral to the fluid, the fluid crosslinks.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE FIGURES

Several aspects of the present invention are illustrated by way of example, and not by way of limitation, in detail in the figures, wherein.

DETAILED DESCRIPTION OF VARIOUS EMBODIMENTS

Figure 1:
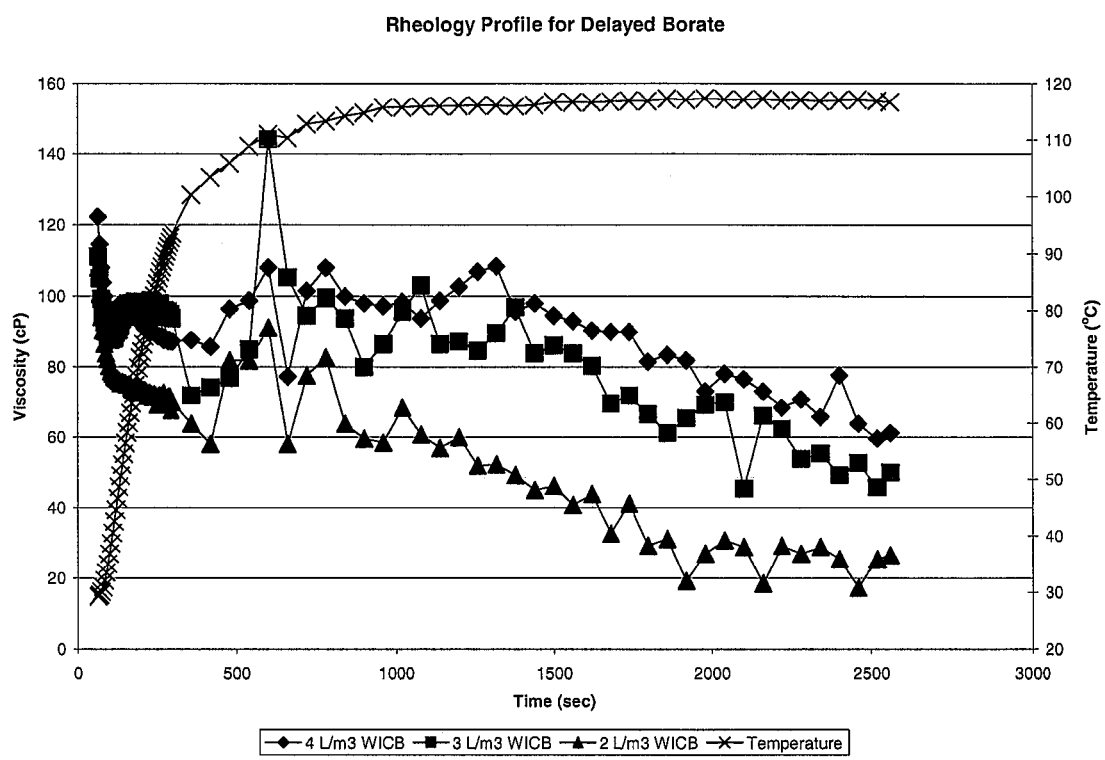
FIG. 1 is a graph showing a rheology profile for aqueous colemanite treated hydroxypropyl guar (HPG) solutions, referenced in Example 1.

The detailed description set forth below in connection with the appended figures is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

A metal sequestering agent may be used with sparingly soluble borate based mineral to provide a high temperature stable fluid that delays crosslinking of a guar or derivatized guar based fluids, such as fracturing fluids. Borate ions in solution cause crosslinking of the guar or derivatized guar based fluids. In a sparingly soluble borate, the limited solubilisation of borate inhibits crosslinking. The metal sequestering agent provides a mechanism to deactivate metal ions arising from the limited solubilisation of the sparingly soluble metal borate such that further metal borate can be solubilised to increase the borate ions in solution. The metal sequestering agent can operate in any of a number of ways, for example, to precipitate the metal ions or to leave the metal ion in solution but modify it such that it become inert to Borate. In one embodiment, for example, the metal sequestering agent may include a chelating agent. In another embodiment, the metal sequestering agent may include an anion that forms a substantially insoluble compound with the metal of the sparingly soluble metal borate. Such anion may include, for example, a carbonate.

The addition of a metal sequestering agent including for example one or more of a chelating agent or an anion, to a guar or derivatized guar based fluid with the addition of a sparingly soluble borate based mineral provides a high temperature stable fluid that delays crosslinking for a short period of time such as more than 30 seconds and, in one embodiment, more than 60 seconds. Delayed crosslinking of 60 to 300 seconds from the preparation of the fluid may be of particular interest. In guar and derivatized guar based fluids, such as fracturing fluids, high temperature stability may also be of interest. High temperature stability can generally be defined as a fluid that reaches a stable viscosity at a set temperature, while an unstable fluid is one whose viscosity declines with increasing temperature and/or over a period of time. Without the addition of the metal sequestering agent, mixtures of sparingly soluble borate based minerals and guar or derivatized guar based fluids tend either (i) not to crosslink and to be unstable at higher temperatures or (ii) to have such a long delay in crosslinking that they are not useful for some fracturing situations.

A fluid according to the present invention includes a viscosifying polysaccharide, termed herein a guar or derivatized guar compound. The guar or derivatized guar compound may typically include one or more of a hydrating gum such as guar gum, hydroxypropylguar or carboxymethylhydroxypropylguar. This list is not comprehensive either. Other galactomannans may also be of use including, for example, locust bean gum, karaya gum, carboxymethylguar, hydroxyethylguar or combinations of these and/or the foregoing gums.

Sparingly soluble borate based minerals are those borate based minerals that are sufficiently insoluble such that they do not immediately (i.e. in <20 seconds) cause the viscosification of a guar based fluid. Stated another way, a sparingly soluble borate-based mineral is one that has a solubility in water at 22° C. of less than 10 kg/m3. Borate based minerals of interest are generally those that include metals from the Group 2 elements from the periodic table. As will be appreciated, the two metals of greatest chemical interest, with respect to safe handling, access, cost and stability, are the alkaline earth metals from Periods 3 and 4: magnesium and calcium. Some readily commercially accessible sparingly soluble calcium borates include:
colemanite; and
ulexite.

Other useful sparingly soluble calcium borates and sparingly soluble magnesium borates may include:
nobleite;
gowerite;
frolovite;
mayeyerhofferite;
inyoite;
priceite;
tertschite;
ginorite;
pinnoite;
patemoite;
kurnakovite;
inderite;
probertite;
preobazhinskite;
hydroboracite; and
inderborite.

The method of delivery the borate species can be varied. The borate could be introduced as a slurry in a hydrocarbon, an aqueous based fluid, other slurries in hydrocarbon derivatives or a powder. Generally in order to provide an effect, the borate mineral may be added in an amount of at least about 0.4 kg/m3 or more of guar gum aqueous-based fluid. Generally amounts between about 0.4 kg/m3 to 10 kg/m3 are of greatest interest based on economics.

A metal sequestering agent, for example, including a chelating agent and/or an anion of interest, may be used to provide a stable delayed crosslinked guar or derivatized guar based fluid, such as may be useful for fracturing. While both the chelating agents and anions work to delay but ultimately catalyze guar crosslinking by reducing the concentration of available calcium in the system, the specific mechanism of their metal sequestration is different. Using colemanite as an example, this borate mineral has limited solubility in water. Addition of a chelating agent renders any solubilised calcium inert to borate and effectively "reduces" the concentration of available calcium in the aqueous fluid which results in the dissolution of further quantities of colemanite. This process repeats and ultimately increases both the solubility of the colemanite and the rate at which the colemanite dissolves. In a fluid system using anions, such anions in the presence of calcium, precipitate out of solution as the calcium salt of the anion. When a metal borate mineral such as colemanite is placed into a solution containing an anion such as carbonate, a small amount of the colemanite will dissolve. The calcium from the colemanite reacts with the carbonate and precipitates. This will result in the dissolution of further quantities of colemanite. This process repeats and ultimately increases both the solubility of the colemanite and the rate at which the colemanite dissolves. Based on the chelating mechanism, chelating agents that form complexes with calcium should catalyze the rate of crosslinking. Based on the precipitation mechanism, organic and inorganic anions that form sparingly soluble salts with calcium should catalyze the rate of crosslinking. High temperature stability is likely achieved due to the increased concentrations of borate present due to the increased solubility.

Chelating agents may be useful as metal sequestering agents. In view of the sparingly soluble borate minerals of interest, chelating agents that form chelates with calcium and magnesium may be most useful. Some chelating agents of interest include:
nitrilotriacetic acid;
ethylenediaminetetraacetic acid;
diethylenetriaminepentaacetic acid;
hydroxyethylenediaminetriacetic acid;
methylglycinediacetic acid;
aminotrimethylenephosphonic acid;
diethyletriaminepentamethylenephosphonic acid;
2-hydroxyethylidenediphosphonic acid;
sodium polyacrylate;
sodium polyaspartate;
tetrasodium iminodisuccinate; and
mono and diphosphate esters of triethanolamine.

The list of chelating agents is not comprehensive, other chelating/sequestering agents may have a similar effect on the borate minerals, such as other scale inhibiting polyacrylates, scale inhibiting copolymers of polyacrylates, polyphosphates, other phosphate esters, other phosphonates, other synthetic or naturally occurring chelating agents or in general chelating/sequestering agents capable of sequestering the metal ion of the metal borate mineral.

High concentrations of anions such as carbonate are also sufficient to provide a short delay in crosslinking and an ultimately stable fluid viscosity at higher temperatures. Anions that have been found to be useful form insoluble compounds in the presence of calcium. Anions that form sparingly soluble salts with calcium and that are of interest include:
carbonate;
citrate;
phosphate; and
oxalate.

The list of anions is not comprehensive. Anions that may also be effective include fluoride, fluosilicate, laurate, linoleate, molybdate, oxalate, metaphosphate, orthophosphate, pyrophosphate, silicate, metasilicate, mesotartrate, stearate, sulfite or in general, anions that can be added in sufficient quantities to form compounds with solubility such that they will form an insoluble compound with the metal of the sparingly soluble borate at the concentrations of the metal that are in solution from the sparingly soluble borate. This property should be sufficient to cause an increase in the rate of solubility of the sparingly soluble metal borate mineral that will be effective in catalyzing the crosslinking of the guar or derivatized guar based fluid and yielding an ultimately stable fluid.

Anions that form soluble salts with calcium are not of interest. With these anions, neither the crosslink time nor the ultimate viscosity of a guar based fluid is enhanced. As an example, anions that have been tested and that fail to provide any benefit include:
chloride;
formate; and
nitrate.

The metal sequestering agent (chelating agent and/or anion) is used in an amount effective to provide a rate of crosslinking and/or high temperature stability, as desired. Adjustments may be made in the amounts of metal sequestering agents added to a fracturing fluid system to achieve the desired result of rate of crosslinking and stability. Generally, the metal sequestering agent is effective in an amount sufficient to catalyze the solubilisation of between about 0.4 and 10 kg/m3 of the sparingly soluble borate mineral. As will be appreciated, this quantity will vary from compound to compound and the relative amounts of each compound that reacts with the metal species. For example, calcium fluoride and calcium carbonate have similar solubility products; however, based on the molecular weights, approximately three times more carbonate would be required to have the same catalytic effect as the fluoride. System conditions, such as temperature, may also effect the useful concentrations of the metal sequestering agent. This phenomenon and system modifications to adjust for it, will also be appreciated by a skilled person. In any event, based on economics, generally the addition of metal sequestering agents in amounts of greater than 10 kg/m3 of guar gum aqueous based fluid is of little interest.

In use a fracturing fluid may be prepared including a viscosifying polysaccharide, a borate-based mineral and a metal sequestering agent, according to any of the various aspects and embodiments disclosed hereinbefore. Because the borate is sparingly soluble, the order of addition of the various components may have no affect on the final fluid.

The fracturing fluid may be pumped downhole and into contact with a formation for fracturing thereof. In one embodiment, the fluid may be used in a method including producing the fracturing fluid in accordance with the description herein, introducing the fracturing fluid to the wellbore to contact a formation accessible through the wellbore and pumping the fracturing fluid with a volume and pressure sufficient to induce and propagate a fracture in the formation. Suitable pressures and volumes would be well understood by a person skilled in the art. The fluid has a delayed viscosifying mechanism, such that the fluid can be prepared by mixing the viscosifying polysaccharide, a sparingly soluble borate based mineral and a metal sequestering agent at surface and thereafter pumping the fluid into the wellbore and into contact with the formation before crosslinking occurs between the borate and the polysaccharide to increase the viscosity of the fluid.

As will be appreciated, the fracturing fluid may include other additive components such as propping agents, non-emulsifiers, surface tension reducers, polymer breaking agents, buffers, etc. Any of these can be used taking care that any such additive does not adversely affect the mechanism of delay crosslinking and the temperature stability of the fluid. Generally, the pH of these fluids may best be maintained above 8. In one embodiment, a fluid of interest may have a pH of 10 or more. At higher pH's the fluids tend to exhibit greater stability.

In various embodiments, the fracturing fluid may be in accordance with various methods, fluids and compounds described hereinbefore.

The surprising benefit of the presence of a chelating agent or an anion is demonstrated in the following examples.

EXAMPLE 1

Addition of Colemanite to an HPG Solution without a Metal Sequestering Agent Present An aqueous suspension of colemanite was prepared. The suspension contained approximately 43% wt/wt colemanite having an assay of 42% boron expressed as $B_2O_3$. The suspension is hereafter referred to as WICB. Methods for the preparation of suspensions of solids in aqueous media are well known, hence are not described herein. WICB was introduced at various concentrations into 200 mL of a guar solution adjusted to a pH of 10.3 with sodium hydroxide. The solution contained 5 kg/m$^3$ of hydrated Jaguar 8000. Jaguar 8000 is a hydroxypropyl guar (HPG) gum manufactured by Rhodia. WICB was introduced while mixing at low speed on a Waring Blender. The guar solution was mixed for 10 seconds then 40 mL of the fluid was transferred into a Brookfield PVS Rheometer cup and fitted with a B5 bob. The rheometer was pressurized to 400 psi with dry nitrogen. The PVS cup was lowered into an oil bath preheated to 120° C., 60 seconds after the addition of WICB and the rheometer set to a shear rate of 100 sec$^{-1}$. The rheological profiles of these guar solutions are presented in FIG. 1. At all concentrations of WICB tested, no crosslinking of the HPG solution was observed, the viscosity remained unchanged.

EXAMPLE 2

Enhanced Crosslinking with Aqueous Colemanite Slurries and Carbonate

Figure 2:
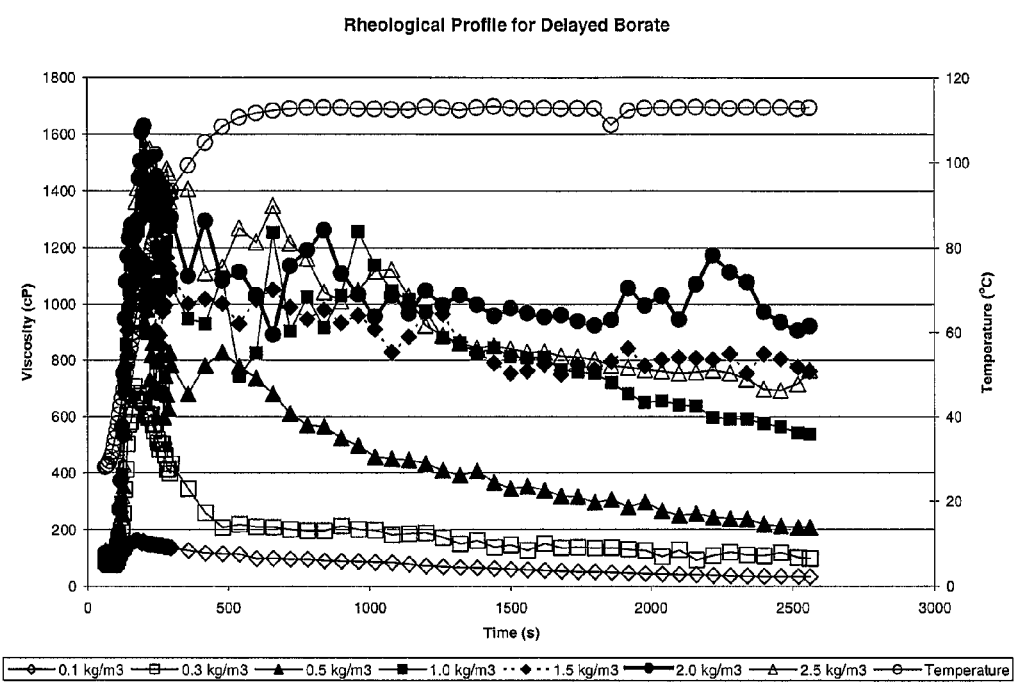
FIG. 2 is a graph showing a rheology profile for aqueous colemanite treated HPG solutions including carbonates, referenced in Example 2.

Various concentrations of sodium bicarbonate were added to 200 mL of a guar solution containing 5 kg/m$^3$ of hydrated Jaguar 8000 and the pH adjusted to 10.3. To this mixture, 0.8 mL WICB was introduced while mixing at low speed on a Waring Blender. Mixing was allowed to continue for 10 seconds then 40 mL of the fluid was transferred into a Brookfield PVS Rheometer cup fitted with a B5 bob. The rheometer was pressurized to 400 psi with dry nitrogen. The PVS cup was lowered into an oil bath preheated to 120° C., 60 seconds after the addition of WICB and the rheometer set to a shear rate of 100 sec$^{-1}$. The rheological profiles of these guar solutions are presented in FIG. 2. A viscosity maximum was observed in all samples after approximately 1-3 minutes. Despite evidence of viscosity maximum, concentrations of sodium bicarbonate of 0.1 kg/m$^3$ 0.3 kg/m$^3$ and 0.5 kg/m$^3$ were insufficient to produce a stable fluid. The viscosity maximum for the 0.1 kg/m$^3$ and 0.3 kg/m$^3$ replications was only slightly higher than the baseline viscosity indicating little crosslinking occurred. Concentrations of 1.0 kg/m$^3$ sodium bicarbonate and greater demonstrated a short delay in crosslinking followed by a viscosity increase to an ultimately stable high viscosity fluid. This demonstrates the surprising effect of carbonate to delay crosslinking and to provide stability of the crosslinked hydroxypropylguar solutions.

EXAMPLE 3

Enhanced Crosslinking with Chelating Agents

Figure 3:
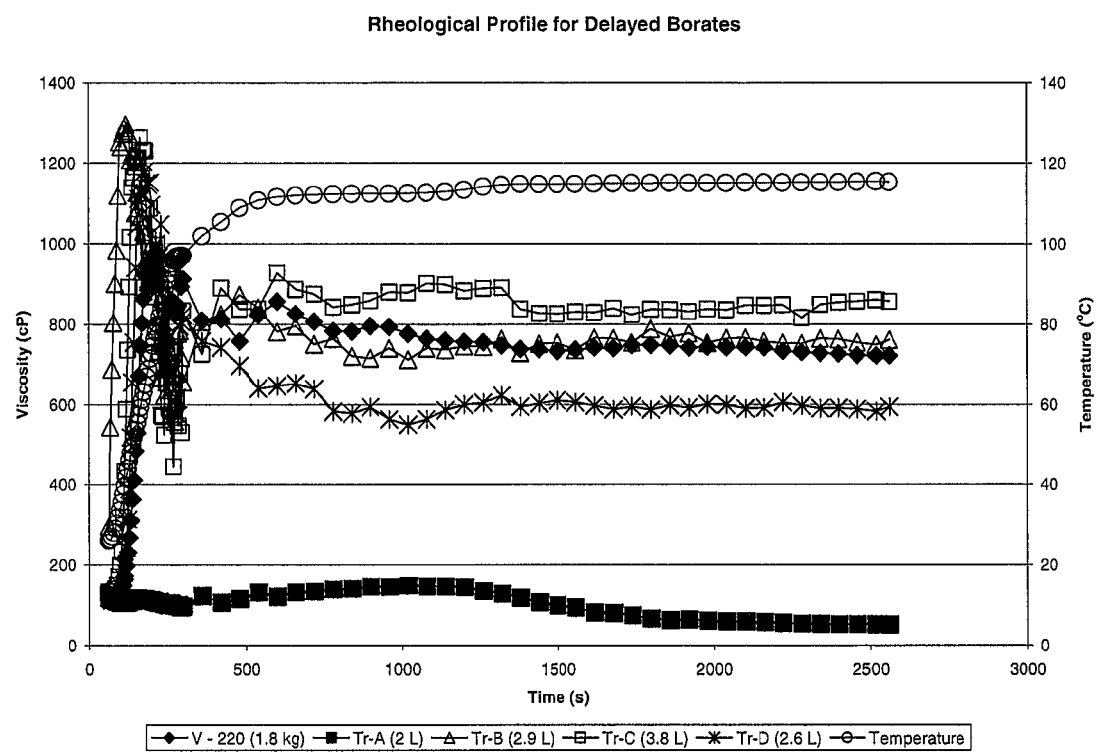
FIG. 3 is a graph showing a rheology profile for aqueous colemanite treated HPG solutions with chelates, referenced in Example 3.
Figure 4:
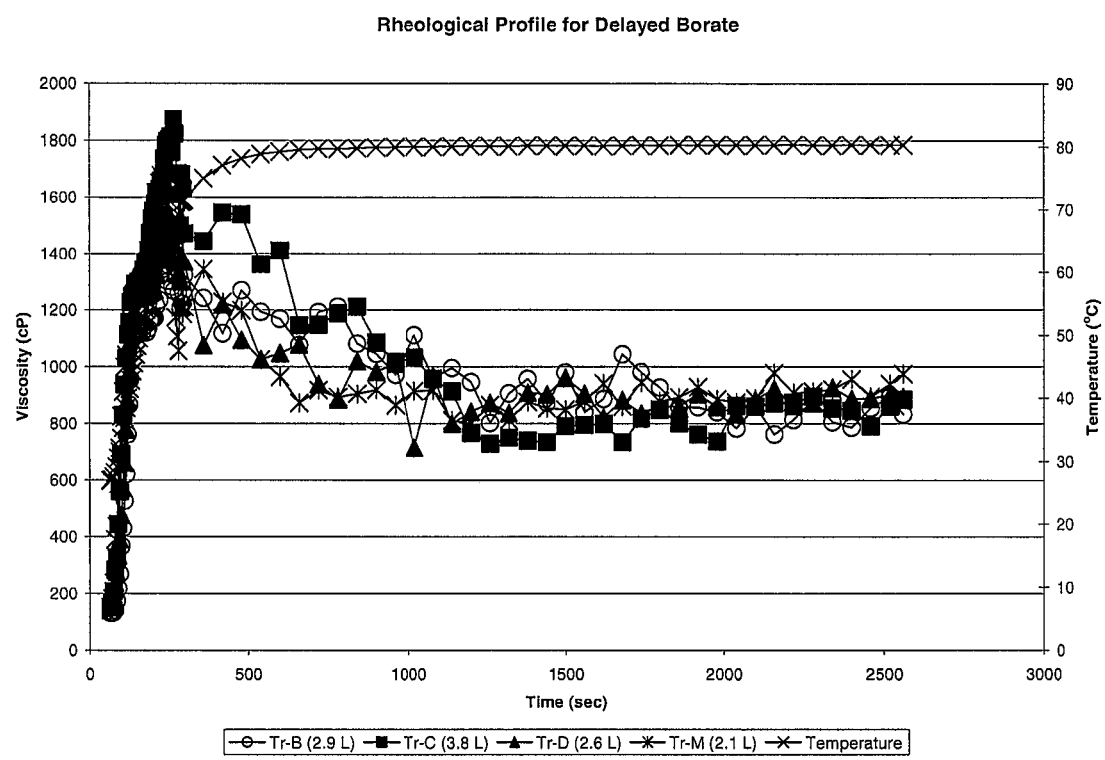
FIG. 4 is a graph showing a rheology profile for aqueous colemanite treated HPG solutions with chelates, referenced in Example 3.
Figure 5:
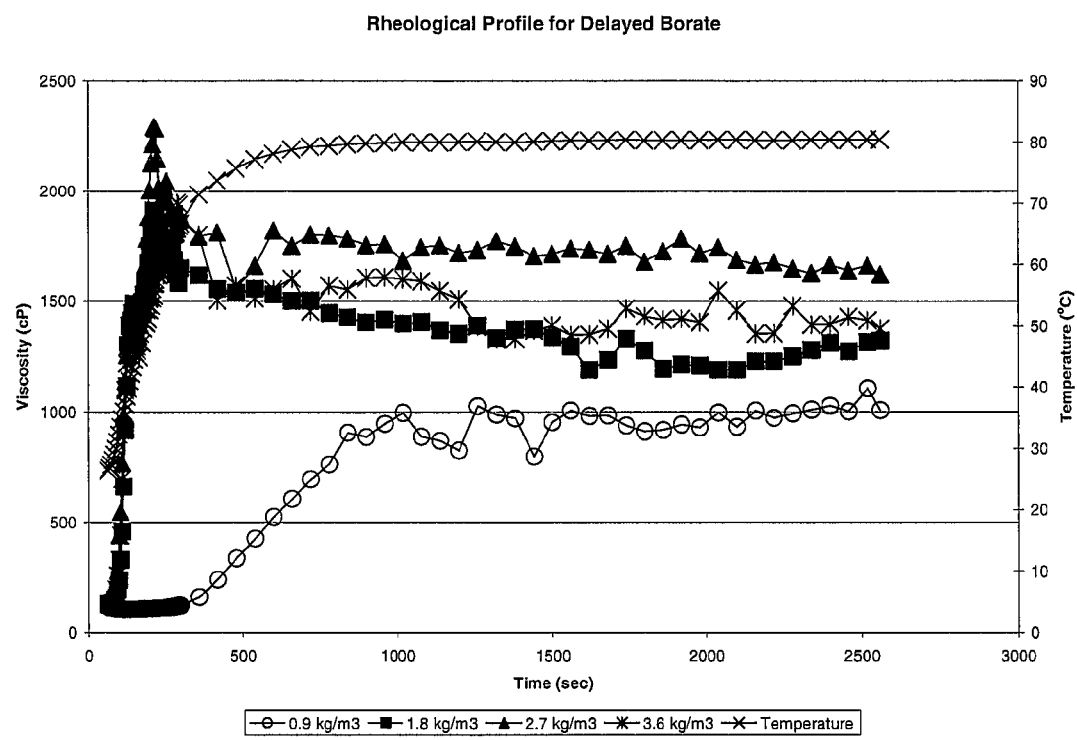
FIG. 5 is a graph showing a rheology profile for HPG solutions treated with a colemanite slurry and with a chelating agent, referenced in Example 4.

Chelating agents were added in separate replications to 200 mL of a guar solution containing 5 kg/m$^3$ of hydrated Jaguar 8000. The pH was adjusted to 10.3 using 0.1 kg/m$^3$ sodium bicarbonate and sodium hydroxide as required. Sodium bicarbonate was added to impart mild buffering capacity to the system. However as was shown in Example 2, this concentration of sodium bicarbonate is ineffective in producing a crosslinked fluid with WICB. To this mixture, 0.8 mL WICB was added while mixing at low speed on a Waring Blender. Mixing was allowed to continue for 10 seconds and then 40 mL of the fluid was transferred into a Brookfield PVS Rheometer cup fitted with a B5 geometry. The rheometer was pressurized to 400 psi with dry nitrogen. The PVS cup was lowered into a bath preheated to 120° C., 60 seconds after the addition of WICB slurry and the rheometer set to a shear rate of 100 sec$^{-1}$. The rheological profiles of these guar solutions are presented in FIG. 3. The chelating agents studied are commercially available materials manufactured by BASF and available under the trademark "Trilon". A summary of the chemistry of the products is provided in Table 1. A short delay time followed by a rapid increase in viscosity was observed in all chelating agents except Trilon A. The test was repeated at 80° C. and the rheological profile of the test is shown in FIG. 4. At 80° C. all chelating agents were effective in catalyzing the crosslink time and providing an ultimately stable viscosity. It is believed that a system including Trilon A could be made to successfully cause delayed crosslinking, with an increased concentration of Trilon A over that employed in the example. It is believed that this illustrates the variations in useful concentrations, as noted above, wherein the useful concentration will vary from compound to compound and with variations in the system conditions, such as variations in temperature.

TABLE 1

Chemistry of Trilon Additives

| Product | Chemical | Concentration (w/v) |
|---|---|---|
| Trilon A | Nitrilotriacetic Acid (trisodium salt) | 40% |
| Trilon B | Ethylenediaminetetraacetic acid (tetrasodium salt) | 40% |
| Trilon C | Diethylenetriaminepentaacetic Acid (pentasodium salt) | 40% |
| Trilon D | Hydroxyethylenediaminetriacetic Acid (trisodium salt) | 40% |
| Trilon M | Methylglycinediacetic Acid (trisodium salt) | 40% |

EXAMPLE 4

Enhanced Crosslinking with Hydrocarbon Colemanite Slurries and Ethylenediaminetetraacetic Acid A suspension of colemanite was prepared in a non-toxic, non-hazardous mineral oil. The slurry contained approximately 38% wt/wt colemanite with an assay of 42% boron expressed as $B_2O_3$. This material is hereafter referred to as MOCB. Methods for the preparation of suspensions of solids in hydrocarbon media are well known hence are not described herein. MOCB was added at 0.8 ml to 200 ml of a guar solution containing 5 kg/m$^3$ of hydrated Jaguar 8000 while mixing at low speed on a Waring Blender. The guar solution had been pretreated with Versene 220, manufactured by Dow Chemical. Versene 220 is the tetrahydrate of the tetrasodium salt of ethylenediaminetetraacetic acid. The solution was mixed for 10 seconds then 40 mL of the fluid was transferred into a Brookfield PVS Rheometer equipped with a B5 bob. The rheometer was pressurized to 400 psi with dry nitrogen. The PVS cup was lowered into an oil bath preheated to 80° C., 60 seconds after the addition of MOCB suspension and the rheometer set to a shear rate of 100 sec$^{-1}$. A short delay was observed before a rapid increase in viscosity in guar solutions treated with 1.8 kg/m$^3$, 2.7 kg/m$^3$ and 3.6 kg/m$^3$ Versene 220. In the solution treated with 0.9 kg/m$^3$ Versene 220 a substantially longer delay before the onset of a rapid increase in viscosity was observed. This demonstrates that chelating agents are useful in the context of the invention regardless of whether the delivery mechanism for the colemanite is a hydrocarbon slurry or an aqueous slurry.

EXAMPLE 5

Enhanced Crosslinking with Ulexite

The mineral ulexite has sufficient solubility and rate of solubility such that it will crosslink and provide a stable guar based fluid without need for the addition of a sequestering agent. Despite this desirable property, the delay in crosslinking of a guar based fluid using ulexite or suspensions there of is often too great to be of use for more shallow wells. To show the desirable attenuating effect of a sequestering agent, 250 mL of 0.5% solution of hydroxypropyl guar in deionized water was prepared, allowed to hydrate for 15 minutes and the pH of the solution adjusted to 10. The solution was then transferred into a 1 L Waring Blender, and the blender speed regulated through a rheostat by adjusting the rheostat to 18 V output. Mixing at this speed resulted in a fluid vortex being formed centered upon the middle of the mixing blades. To this mixture, a hydrocarbon slurry containing 400 g ulexite/L of slurry was injected at 3 L/m3. The fluid thickened gradually and after 290 seconds the fluid vortex was found to close. The procedure was repeated, except 3 L/m3 Trilon B liquid was added before addition of the hydrocarbon ulexite slurry. After 100 seconds the vortex was found to close. This example demonstrates the desirable attenuating effect that can be achieved by the addition of a sequestering agent. A 290 second delay may be acceptable, for example, in a deeper well where there is a longer transit time for the fracturing fluid to be pumped from surface, where it is prepared, to the perforations of the oil/gas bearing formation, yet be unacceptable in a shallow well with a much shorter transit time between the fracturing fluid pumper and the perforations of the oil/gas bearing formation. Hence the sequestering agent would allow the use of the ulexite as a crosslinker in situations which required shorter delay times than those provided by ulexite itself, without a sequestering agent, extending the range of conditions under which the ulexite would be useful as a crosslinker.

Controlled delay of the crosslink and the formation of the resultant stable solutions are not limited to the compounds listed in these examples, nor to the method of delivery of the mineral, nor to the mineral used in the examples. For example, most sparingly soluble borate minerals, such as for example ulexite, nobleite, gowerite, frolovite, colemanite, mayeyerhofferite, inyoite, priceite, tertschite, ginorite, pinnoite, patemoite, kurnakovite, inderite, preobazhinskite, hydroboracite, inderborite or in general sparingly soluble borate compounds comprised of borate and a chelatable metal ion may work in an analogous manner.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A method for fracturing a formation accessible through a wellbore, the method comprising: providing a fracturing fluid including a viscosifying polysaccharide, 0.4 and 10 kg/m$^3$ of colemanite as a sole source of borate for crosslinking the viscosifying polysaccharide, and an effective amount of a metal sequestering agent including a chelating agent for chelating with calcium to viscosify the fracturing fluid 30 to 300 seconds after mixing the viscosifying polysaccharide, the colemanite and the metal sequestering agent; introducing the fracturing fluid to the wellbore to contact the formation; and pumping the fracturing fluid to induce and propagate a fracture in the formation.

2. The method for fracturing a formation of claim 1 wherein providing a fracturing fluid is conducted at surface.

3. The method for fracturing a formation of claim 1 wherein the fracturing fluid viscosifies when in the wellbore.

4. The method for fracturing a formation of claim 1 wherein in providing the fracturing fluid, the viscosifying polysaccharide is a guar or derivitized guar compound.

5. The method for fracturing a formation of claim 1 wherein the fluid is aqueous.

6. The method for fracturing a formation of claim 1 wherein the colemanite is added as a mixture in an aqueous liquid.

7. The method for fracturing a formation of claim 1 wherein the colemanite is added as a slurry in a liquid hydrocarbon.

8. The method for fracturing a formation of claim 1 wherein the chelating agent is nitrilotriacetic acid.

9. The method for fracturing a formation of claim 1 wherein the chelating agent is ethylenediaminetetraacetic acid.

10. The method for fracturing a formation of claim 1 wherein the chelating agent is diethylenetriaminepentaacetic acid.

11. The method for fracturing a formation of claim 1 wherein the chelating agent is hydroxyethylenediaminetriacetic acid.

12. The method for fracturing a formation of claim 1 wherein the chelating agent is methylglycinediacetic acid.

13. The method for fracturing a formation of claim 1 wherein the chelating agent is a monophosphate ester of triethanolamine.

14. The method for fracturing a formation of claim 1 wherein the chelating agent is a diphosphate ester of triethanolamine.

15. The method for fracturing a formation of claim 1 wherein the calcium is from the colemanite.

16. The method for fracturing a formation of claim 1 wherein the effective amount is less than 10 kg/m$^3$.

17. The method for fracturing a formation of claim 1 wherein the effective amount is between 0.9 kg/m$^3$ and 10 kg/m$^3$.

* * * * *